US012739324B2

(12) United States Patent
Yazovsky et al.

(10) Patent No.: US 12,739,324 B2
(45) Date of Patent: Sep. 15, 2026

(54) SYSTEM AND METHOD FOR CLASSIFYING CALLS

(71) Applicant: AO Kaspersky Lab, Moscow (RU)

(72) Inventors: Daniil A. Yazovsky, Moscow (RU); Dmitry V. Shvetsov, Moscow (RU); Vitaly S. Vorobiov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 381 days.

(21) Appl. No.: 18/360,997

(22) Filed: Jul. 28, 2023

(65) Prior Publication Data

US 2024/0195913 A1 Jun. 13, 2024

(30) Foreign Application Priority Data

Dec. 9, 2022 (RU) ........................... RU2022132318

(51) Int. Cl.
*H04M 3/436* (2006.01)
*G06F 40/242* (2020.01)

(52) U.S. Cl.
CPC .......... *H04M 3/436* (2013.01); *G06F 40/242* (2020.01); *H04M 2203/651* (2013.01)

(58) Field of Classification Search
CPC ............ H04M 3/436; H04M 2203/651; G06F 40/242
USPC .......................................................... 455/415
See application file for complete search history.

(56) References Cited

U.S. PATENT DOCUMENTS

| | | | |
|---|---|---|---|
| 8,325,900 B2 | 12/2012 | Trivi et al. | |
| 10,841,424 B1 | 11/2020 | Lemus et al. | |
| 2022/0201121 A1* | 6/2022 | Kane ....................... | G10L 25/30 |
| 2023/0012008 A1* | 1/2023 | Li ....................... | H04L 65/1104 |

* cited by examiner

*Primary Examiner* — Jirapon Tulop
(74) *Attorney, Agent, or Firm* — ArentFox Schiff LLP; Michael Fainberg

(57) ABSTRACT

Disclosed herein are systems and methods for classifying calls on a remote device. In one aspect, an exemplary method comprises, collecting call data for each call, wherein each call is associated with a unique call identifier, extracting significant features from the collected call data, generating a call classification model based on the extracted significant features, wherein the call classification model comprises a set of rules based on which a predetermined call class is assigned to the call, extracting a text review from the collected call data, generating a generative review model based on the extracted text review, the generative review model used for correlating text reviews with a call class, and classifying the call for which the call data was collected based on the call classification model generated and the generative review model.

18 Claims, 5 Drawing Sheets

300
Calls
111
Call data collector
310
Call data
112
Significant feature extractor
320
Significant features
321
Call classification model generator
330
Call classification model
331
Text user review collector
340
Text/comment review/ feedback from user
341
Review model generator
350
Generative review model
351
Call classifier
360

400
111
Calls
410
Collect data about calls
112
Call data
420
Extract significant features
321
Significant features
430
Generate a call classification model
331
Call classification model
440
Extract text reviews
341
Text user reviews
450
Generate generative review model
351
Generative review model
460
Classify calls

SYSTEM AND METHOD FOR CLASSIFYING CALLS

CROSS REFERENCE TO RELATED APPLICATIONS

The present application claims priority to Russian Patent Application No. 2022132318, filed on 9 Dec. 2022, the entire contents of which are incorporated herein by reference.

FIELD OF TECHNOLOGY

The present disclosure relates to the field of information security, and more specifically to systems and methods for classifying calls.

BACKGROUND

The rapid development of computer technology in the last decade, as well as the widespread use of a variety of computing devices (personal computers, laptops, tablets, smartphones, etc.) have become a powerful incentive for the use of these devices in various fields of activity and for a huge number of tasks (from Internet surfing to bank transfers and electronic document management). In parallel with the growth in the number of computing devices and the amount of software running on these devices, the number of malicious programs also grew rapidly.

As a consequence of this development of computer technologies and threats, ensuring the security of user data both on the computing devices themselves and in the process of transferring these data between computing devices have become important tasks.

A special case of user data includes the user's personal data, such as:

- basic personal data, such as full name, place of registration, information about education, place of work, phone number, email address;
- special information about a person's personality, for example, race and nationality, political, religious view, philosophical views, health status, details of intimate life, information about criminal records;
- biometrics—physiological or biological characteristics of a person that are used to establish the identity of the person, for example, photographs, fingerprints, DNA analysis, blood type, height, eye color, weight, and others; and
- other types of user data—these include all data that cannot be attributed to the types presented above, for example, belonging to a particular social group, corporate data, and so on.

More and more of the user data is analyzed, not on the user's side, but on the side of third parties, while the results of the analysis are used on the user's device or devices. For example, data on physiological characteristics of the user may be collected from the user (for example, when buying clothes, the user may indicate his/her size, when receiving certain content—the user may indicate his/her age, etc.). The collected physiological characteristics of the user may then be analyzed on servers of online stores. Based on the analyzed data, the most suitable products for the user may be selected (in the above example, this can be data on new collections of clothes suitable for the user), and product data may be downloaded to one or more devices of the user (e.g., personal computers, mobile phones, etc.). The downloaded produce data may then be evaluated by the user. In another example, a similar approach is used, but this time, the product is software. The user is provided software based on the user's preferences, as well as based on behavioral patterns of the tasks performed by the user via the computing devices of the user. In this case, all the necessary analysis can be performed on servers of distributors of the software. After the analysis is performed, the software is provided (installed) on the one or more devices of the user. The downloading or installation of the software may be with or without the consent of the user.

One of the requirements for the analysis of personal data is preliminary depersonalization—the transformation of data in such a way that it would be impossible to unambiguously obtain information about the user from the data. For example, when analyzing phone numbers, the phone numbers themselves are not transmitted to the user in order to identify unwanted calls. Rather, the hashes of the phone numbers are transmitted.

One example use of the user's personal data is for detecting spam calls based on feedback from mobile devices of the users. In such cases, users transmit some personal information when classifying calls. However, when the classification is performed remotely, the security of the data transmitted from a mobile device is jeopardized.

Thus, there is a need for a more optimal way of classifying calls.

SUMMARY

Aspects of the disclosure relate to classifying calls. In another aspect of the disclosure, improvement in the accuracy of determining that the call is undesirable. Another aspect of the disclosure is ensuring the security of the user's personal data.

In one exemplary aspect, a method is provided for classifying calls, the method comprising: collecting call data for each call, wherein each call is associated with a unique call identifier; extracting significant features from the collected call data; generating a call classification model based on the extracted significant features, wherein the call classification model comprises a set of rules based on which a predetermined call class is assigned to the call; extracting a text review from the collected call data; generating a generative review model based on the extracted text review, the generative review model used for correlating text reviews with a call class; and classifying the call for which the call data was collected based on the call classification model generated and the generative review model.

In one aspect, the unique call identifier comprises: a phone number; or a unique identifier for the caller when using instant messaging and Voice over Internet Protocol (VOIP) services.

In one aspect, the call data includes at least one of: a significant feature that includes at least one of: a call identifier; a duration of the call; a time of the call; which participant of the call ended the call; and whether data was transferred between a calling party and a receiving party of the call; and a text review received from one or more users, the text review comprising at least one of: a list of classifications of calls; and information about classification errors by an automated system.

In one aspect, a Latent Dirichlet allocation (LDA) generative model is used as a generative review model.

In one aspect, the classifying of the call is performed by weighting relative contributions of each of the generated generative review models.

In one aspect, the classifying of the call is further based on data on previous classified calls including at least one of: identification of the call by which the classification was made; a dictionary with word forms, the word forms being based on text reviews from users, the text reviews being associated with call identifiers with which the classification was performed; and previously formed classifying heuristics.

In one aspect, the unique call identifier is recognized as an undesirable when at least one of the following conditions is satisfied: a call duration associated with a suspicious call identifier being less than a predetermined threshold; and a party ending the call being the receiving party of the call.

According to one aspect of the disclosure, a system is provided for classifying calls, the system comprising any combination of one or more hardware processors, configured to: collect call data for each call, wherein each call is associated with a unique call identifier; extract significant features from the collected call data; generate a call classification model based on the extracted significant features, wherein the call classification model comprises a set of rules based on which a predetermined call class is assigned to the call; extract a text review from the collected call data; generate a generative review model based on the extracted text review, the generative review model used for correlating text reviews with a call class; and classify the call for which the call data was collected based on the call classification model generated and the generative review model.

In one exemplary aspect, a non-transitory computer-readable medium is provided storing a set of instructions thereon for classifying calls, wherein the set of instructions comprises instructions for: collecting call data for each call, wherein each call is associated with a unique call identifier; extracting significant features from the collected call data; generating a call classification model based on the extracted significant features, wherein the call classification model comprises a set of rules based on which a predetermined call class is assigned to the call; extracting a text review from the collected call data; generating a generative review model based on the extracted text review, the generative review model used for correlating text reviews with a call class; and classifying the call for which the call data was collected based on the call classification model generated and the generative review model.

The method and system of the present disclosure are designed to classify calls, improve the accuracy in determining that a call is undesirable, and ensure the security of the user's personal data.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for recognizing undesirable calls and/or classifying calls. Examples are provided for illustrating the essence of the present method for recognizing undesirable calls and/or for classifying calls. However, the implementation is not limited to the exemplary scenarios disclosed below. The description is intended to assist a person skilled in the art for a comprehensive understanding of the disclosure.

Figure 1:
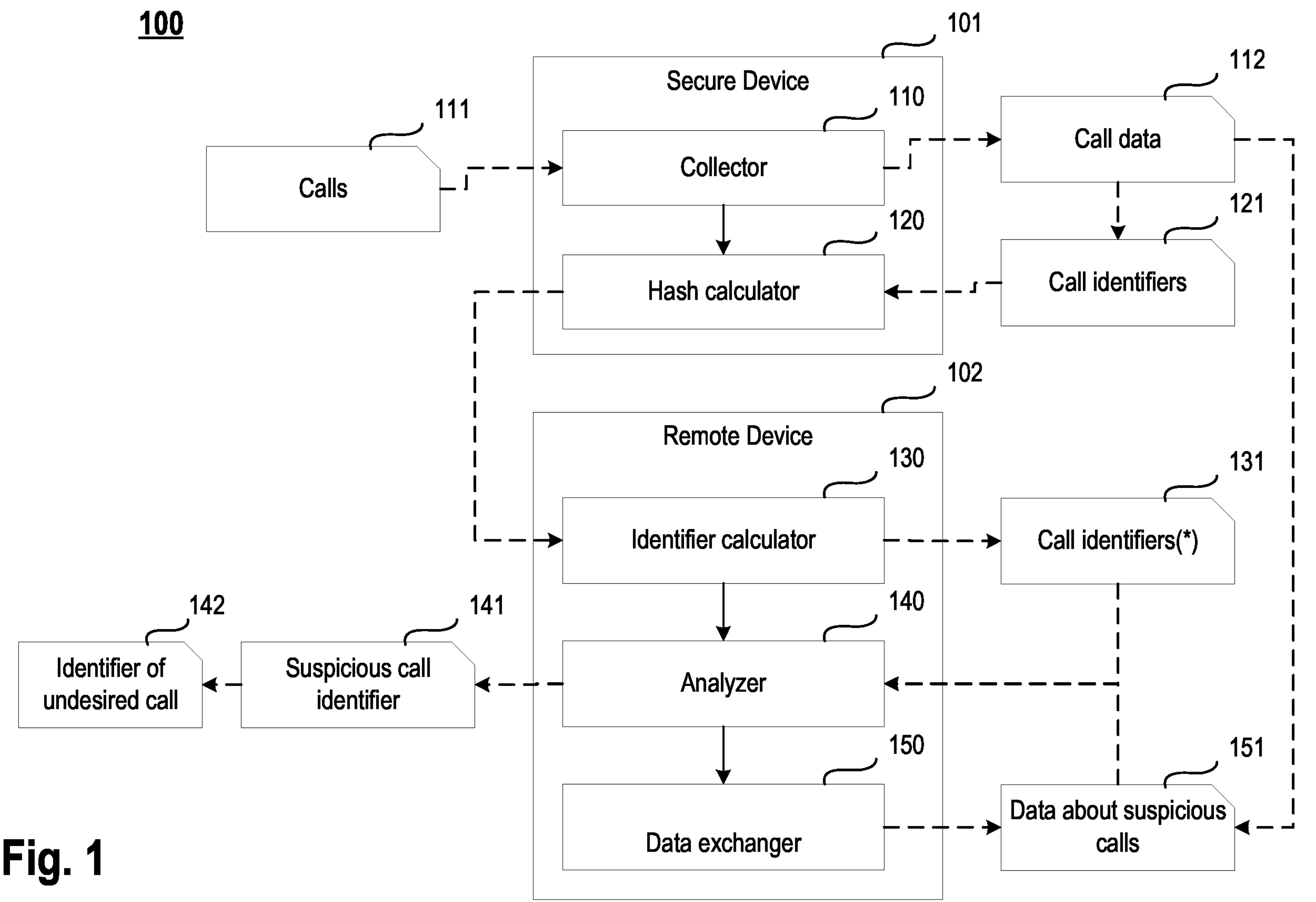
FIG. 1 illustrates an example of a system for recognizing undesirable calls in accordance with aspects of the present disclosure.

FIG. 1 illustrates an example of a system 100 for recognizing undesirable calls in accordance with aspects of the present disclosure.

The system 100 for recognizing undesirable calls comprises a secure device 101 and a remote device 102. The secure device 101 comprises a collector 110, hash calculator 120. The remote device 102 comprises an identifier calculator 130, an analyzer 140, and a data exchanger 150. In one aspect, the aforementioned components of the secure device 101 and the remote device 102 may be implemented as elements of a computer system or set of computer systems, described in more detail in FIG. 5.

The secure device 101 comprises a computing device on which data security is ensured in any manner known in the art (e.g., hardened OS, an antivirus application, or other means). Data security, as used herein, includes trusting the level of data security on the secure device 101 (e.g., a mobile device) and believing that as long as the data is handled (i.e., created or modified) on the secure device 101, the data will not be compromised (i.e., no unauthorized modification or copying of data will be performed on the secure device). An example of a known method of ensuring data security may be using software, such as Kaspersky Internet Security for Android devices.

In one aspect, at least one of the following devices serves as a protected device 101:

- a mobile device that includes hardware and software capabilities to implement at least one of the following: cellular calls, voice over IP calls, instant messaging, including: mobile phone; smartphone; IP phone, and tablet with the ability to make mobile calls;
- a computer with instant messaging and voice over IP software installed; and
- another computing device that has capabilities to implement the above functionality.

As described above, in one aspect, the secure device 101 includes the collector 110 and the hash calculator 120.

In one aspect, the remote device 102 comprises a computing device that is physically separated from the secure device 101.

In one aspect of the system 100, at least one of the following devices serves as a remote device 102: a remote server; and a cloud service.

In one aspect, the security of data on the remote device 102 is also trusted, i.e., it is believed that as long as the data is handled on the remote device 102, the data is not compromised.

As described above, in one aspect, the remote device 102 includes the identifier calculator 130, the analyzer 140, and the data exchanger 150. Based on the above-described operation of the secure device 101 and the remote device 102 with any data used on the secure device 101 or remote device 102, the only place where the data can be compromised is when data is being transmitted from the secure device 101 to the remote device 102.

To provide additional security for data being transmitted from the secure device 101 in the event that the remote device 102 is nevertheless compromised, it is required that the data received by the remote device 102 not be used for unambiguously recreating the data contained on the secure device 101.

For example, if on a secure device 101, which may be a mobile device of the user (for example, a mobile phone, smartphone, etc.), data on calls to the specified mobile device may be collected, pre-processed and transmitted to the remote device 102, which may be the server of the antivirus company. Then, the server of the antivirus company should not contain information that allows the antivirus company or a third party to uniquely determine from or to information which identify (e.g., phone numbers) calls made on the user's mobile device, while the identifier (e.g., phone numbers) characterizes the specified device, i.e., distinguishes the specific device from similar devices.

In one aspect, the collector 110 is configured to collect call data 112, wherein each call 111 is associated with a specific call ID 121. In one aspect, at least one of the following serves as the call identifier 121: a phone number; or a unique identifier of the caller when using an instant messaging service and/or a Voice over IP (VOIP) communication.

In one aspect of the present disclosure, the call data 112 includes at least one of the following: a call duration; a call time; which of the parties participating in the call 111 completed the call 111; and whether data was transferred between the receiving party and the calling party of the call 111.

In one aspect, the transmission of data between the receiving party and the calling party of the call 111 may consist at least one of the following: an implementation of a conversation, i.e., for a transmission of audio information, and/or for a transfer of a data stream.

In one aspect, the collector 110 intercepts calls 111 directed to the secure device 101 and collects call data 112. In one aspect, the collection of call data includes calculating information about the collected call data 112.

For example, a user may receive a call 111 from an unknown phone number on a secure device 101, which may be the user's mobile phone. The call 111 is intercepted by the collector 110, that is, in parallel with the application serving the specified call 111, the collector 110 also receives access to the call. The collector 110 determines the call data 112 including, for example, the time of the call 111 (e.g., 02-08-2021 11:30:17.125), the duration of the call (e.g., 47.870 seconds), the fact that the calling party ended the call, and that during the call, there was communication (i.e., audio information was transmitted) from outside of the calling party, and on the part of the user.

In one aspect, the collector 110 collects the call data 112 for a specified period of time.

In another aspect, the collector 110 collects call data 112 associated with call IDs 121 within a specified time period.

In one aspect, the hash calculator 120 is configured to compute a probabilistic hash based on call IDs 121 associated with the collected call data 112, wherein the probabilistic hash provides the ability to obtain a false positive result in determining whether the call ID was used in calculating the specified hash.

A probabilistic hash with the above properties allows depersonalization of the user's data. For example, if 10 phone numbers are collected and a probabilistic hash is calculated based on the 10 phone number, when attempting to restore the phone number, the system 100 may get 15 phone numbers that cannot be used to unambiguously determine which of the 15 phone numbers were part of the original 10 phone numbers.

In one aspect of the present disclosure, a Bloom filter is used to calculate the probabilistic hash.

In one aspect, the probabilistic hash is computed based only on call IDs 121 that are not stored in a trusted contact list of the secure device 101.

For example, if the user's mobile phone acts as a secure device 101, then call data 112 is collected and a probabilistic hash is generated only for those phone numbers that are not in the user's contacts, that is, data only on phone numbers unknown to the user are collected.

In one aspect, the identifier calculator 130 is configured to generate call identifiers 131 from a probabilistic hash.

In one aspect of the present disclosure, the identifier 131 comprises at least one of:

- a convolution generated by probabilistic hash, while the convolution may be an alphanumeric sequence of characters;
- an identifier of the probabilistic hash record in the system for recognizing the call as undesirable (if the system records received calls, for example, in a database); and
- the probabilistic hash itself.

For example, a Message Digest Method 5 (MD5) hash may be generated from a phone number thereby resulting in a 128-bit digest from the string of any length. The 128-bit digest may then be folded to create sequences of a given length via a checksum algorithm, for instance, to a Cyclic Redundancy Check 32 (CRC32) which results in a sequence having 32-bit values. Since the number of phone numbers is limited (billions), it is possible to make a table of correspondence between the hashes and the phone numbers (which may be calculated in advance). Thus, the usage of hashes may be as insecure as the usage of phone numbers that are not hashed. However, if the algorithm for calculating the hash is complex and unknown to a potential attacker, then this problem disappears.

The identifier 131 itself can be a number in a given range, and a probabilistic hash can be a numeric alphabetic sequence, so each character from the sequence can be assigned a number, and the final identifier can be calculated as a result of arithmetic operations on the specified numbers.

In one aspect, the hash calculator 120 performs an inverse of calculating the probabilistic hash. Since the algorithm for calculating the probabilistic hash from the call IDs 121 guarantees uncertainty when recovering the specified call IDs 131, the user data is depersonalized, which, in turn, ensures the confidentiality of user data.

In one aspect, the analyzer 140 is configured to: determine a suspicious call identifier 141 based on the analysis of the generated call identifiers 131; and recognize the suspicious call identifier 141 as undesirable—thereby recognizing the identifier of undesired call 142. Consequently, the call 111 is recognized as undesirable based on the analysis of the data 151 which is data about suspicious calls.

In one aspect of the present disclosure, the analysis of the generated call identifiers 131 is carried out by using frequency analysis techniques. For example, how often calls 111 were made from a particular phone number may be determined. If several calls were made from a certain phone number, and the user dropped the call, or the duration of the call was short (for example, no more than one second), then such a phone number may be recognized as a suspicious call.

In one aspect, during frequency analysis, the frequency of occurrence of the call identifier 131 is determined. When the frequency of occurrence of a given call identifier 131 is above a specified (predetermined) threshold, then the given call identifier 131 is recognized as a suspicious call identifier 141. For example, the predetermined threshold may specify a given number of occurrences of the call identifier in a given duration of time, for instance 100 occurrences in 12 hours, and the like.

In one aspect, the frequency analysis of the generated call identifiers 131 is carried out by using multivariate frequency analysis, where at least two of the following parameters are used as measurements:

- a frequency of occurrence of the call ID 121 in the generated call IDs 131;
- a frequency of occurrence of the call ID 121 in each of the probabilistic hashes; and
- a set of probabilistic hashes in which the call ID 121 appears.

In one aspect, a suspicious call identifier 141 is recognized as an identifier of an undesirable call 142, and, consequently, the call 111 itself is also recognized as undesirable if at least one of the following conditions are met:

- the call duration for suspicious call ID 141 is less than a predetermined threshold; and
- the party ending the call 111 is the receiving party.

The data exchanger 150 comprises a communication device that is configured to request, from the secure device 101, data about a suspicious call 151. The data about the suspicious call is associated with a suspicious call identifier 141.

In one aspect, upon request from the remote device 102, the secure device 101 additionally collects data associated with the suspicious call identifier 141.

On the one hand, in order to increase the security of user data (i.e., data on a secure device 101), it is necessary to reduce the amount of data transmitted to the remote device 102. On the other hand, in order to improve the efficiency of the described system, it is necessary to transmit as much data as possible from the secure device 101 to the remote device 102. A compromise solution is that only the minimum amount of data required to render a verdict is initially transmitted from the secure device 101 to the remote device 102, as described above. However, in the case where the previously collected data set is not sufficient to render a verdict with a given accuracy or when additional data may be used to improve the efficiency of the system (e.g., used to retrain models), this data is additionally requested from the secure device 101.

For example, a suspicious call identifier may be transmitted to a mobile phone from a remote server, which may then be used to collect data and transfer the collected data to the remote server.

Figure 2:
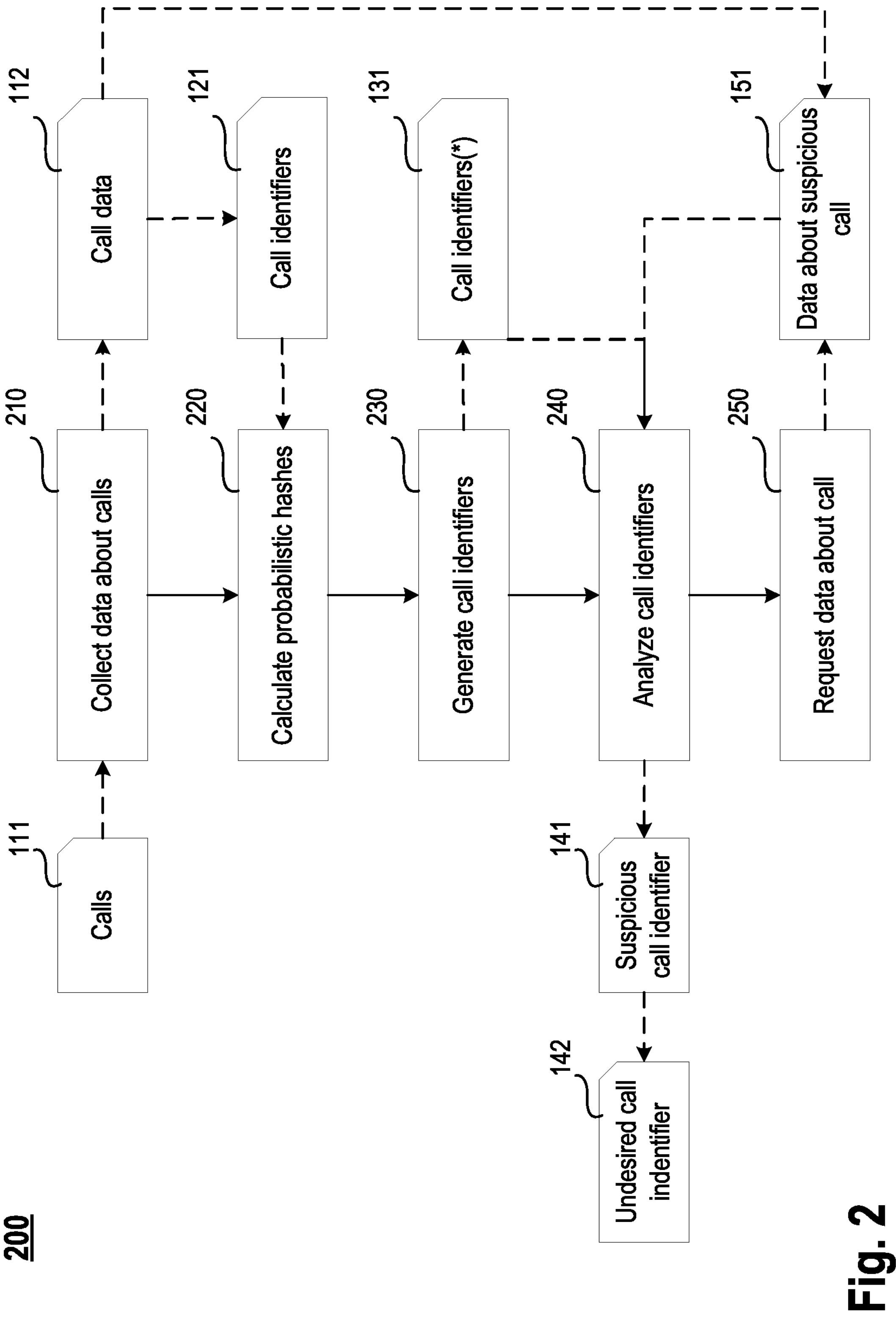
FIG. 2 illustrates an exemplary method for recognizing undesirable calls in accordance with aspects of the present disclosure.

FIG. 2 illustrates an exemplary method 200 for recognizing undesirable calls in accordance with aspects of the present disclosure. The method of recognizing a call as an undesirable call is performed using the system 100 (as shown in FIG. 1), which contains a processor and memory for the purpose of processing calls and collected data to determine whether or not the call is undesirable in accordance with aspects of the present disclosure. The method 200 for recognizing a call as undesirable includes a step 210 at which call data 112 is collected, a step 220 at which a probabilistic hash is calculated, a step 230 at which call identifiers are generated, a step 240 at which call identifiers are analyzed, and a step 250 at which call data is requested.

In step 210, method 200 collects call data 112 using the collector 110, with each call 111 being associated with a specific call ID (unique call IDs) 121. In one aspect, the secure device 101 which is in communication with the remote device 102 via a communications network, collects the call data 112.

In one aspect, the call identifier 121 comprises at least one of the following: a phone number; and/or a unique identifier of a caller of the call 111, for example, when using instant messaging and voice over IP services, the unique ID may not be a phone number.

In one aspect, the call data 112 includes at least one of the following: a call duration; a call time; which of the parties participating in the call 111 ended the call 111; whether data was transferred between the receiving and calling parties of the call 111.

In one aspect, call data 112 for a specified period of time is collected.

In one aspect, call data 112 is collected, wherein the collected call data is associated with call IDs 121 and wherein the collection of the call data 112 is performed within a specified period of time.

In step 220, method 200 computes a probabilistic hash, wherein the probabilistic hash provides the ability to obtain a false positive result in determination of whether the call identifier 121 was used in computation of the probabilistic hash, and transmits the computed probabilistic hash to the remote device 102. In one aspect, the secure device 101 which is in communication with the remote device 102 via a communications network, computes the probabilistic hash based on the call IDs 121 which is associated with the call data 112 collected in step 210 using the hash calculator 120.

In one aspect, the probabilistic hash is computed using a Bloom filter.

In one aspect, the probabilistic hash is computed based only on call identifiers 121 that are not in a list of trusted contacts of the secure device 101.

In step 230, method 200 generates call identifiers 131 from the probabilistic hash computed at step 220 using the identifier calculator 130, which may be located on the remote device 102.

In one aspect, the call identifier 131 comprises at least: a convolution generated by probabilistic hash, wherein the convolution comprises an alphanumeric sequence of characters; an identifier of the probabilistic hash record that is used for recognizing undesirable calls, or the probabilistic hash itself. In one aspect, if the system records received calls, the identifier of the probabilistic hash record may be, for example, from a system record stored in a database.

In step 240, method 200 analyzes the call identifiers 131 to identify at least one suspicious call based on the analysis of the generated call IDs 131, recognizes at least one suspicious call identifier 141, thereby recognizing the call 111 as undesirable call identifier 142. The analysis of the call identifiers 131 may be performed on the remote device 102 using the analyzer 140. In one aspect, step 240 is invoked to execute the analysis of call identifiers 131 when a request is received with regard to data about suspicious calls 151, wherein the request is received from the secure device 101 associated with the suspicious call identifier. Thus, step 240 may be invoked after step 250.

In one aspect, the analysis of the generated call identifiers 131 is carried out by applying frequency analysis.

In another aspect, during frequency analysis, the frequency of occurrence of the call identifier 131 is determined; and when the frequency of occurrence of the call identifier 131 is above a specified (predetermined) threshold, the call identifier 131 is recognized as a suspicious call identifier 141.

In another aspect, the frequency analysis of the generated call identifiers 131 is carried out by using multivariate frequency analysis, where at least two of the following parameters are used as measurements:

- a parameter associated with a frequency of occurrence of the call ID 121 in the generated call IDs 131;
- a parameter associated with a frequency of occurrence of the call ID 121 in each of the probabilistic hashes; and
- a parameter associated with a set of probabilistic hashes in which the call ID 121 is observed.

In another aspect, the suspicious call identifier 141 is recognized as an identifier of an undesirable call 142, and, accordingly, the call 111 itself is also recognized as undesirable if at least one of the following conditions are satisfied: the call duration for suspicious call ID 141 is less than a predetermined threshold; and the party ending the call 111 is the receiving party.

In step 250, method 200, by the data exchanger 150 located on the remote device 102, requests data about suspicious calls 151 from the secure device 101 associated with the suspicious call identifier 141. The requested data includes information about the call associated with the specified suspicious call identifier 141.

In one aspect, upon receiving the request from the remote device 102, the secure device 101 collects data associated with the suspicious call identifier 141.

Figure 3:
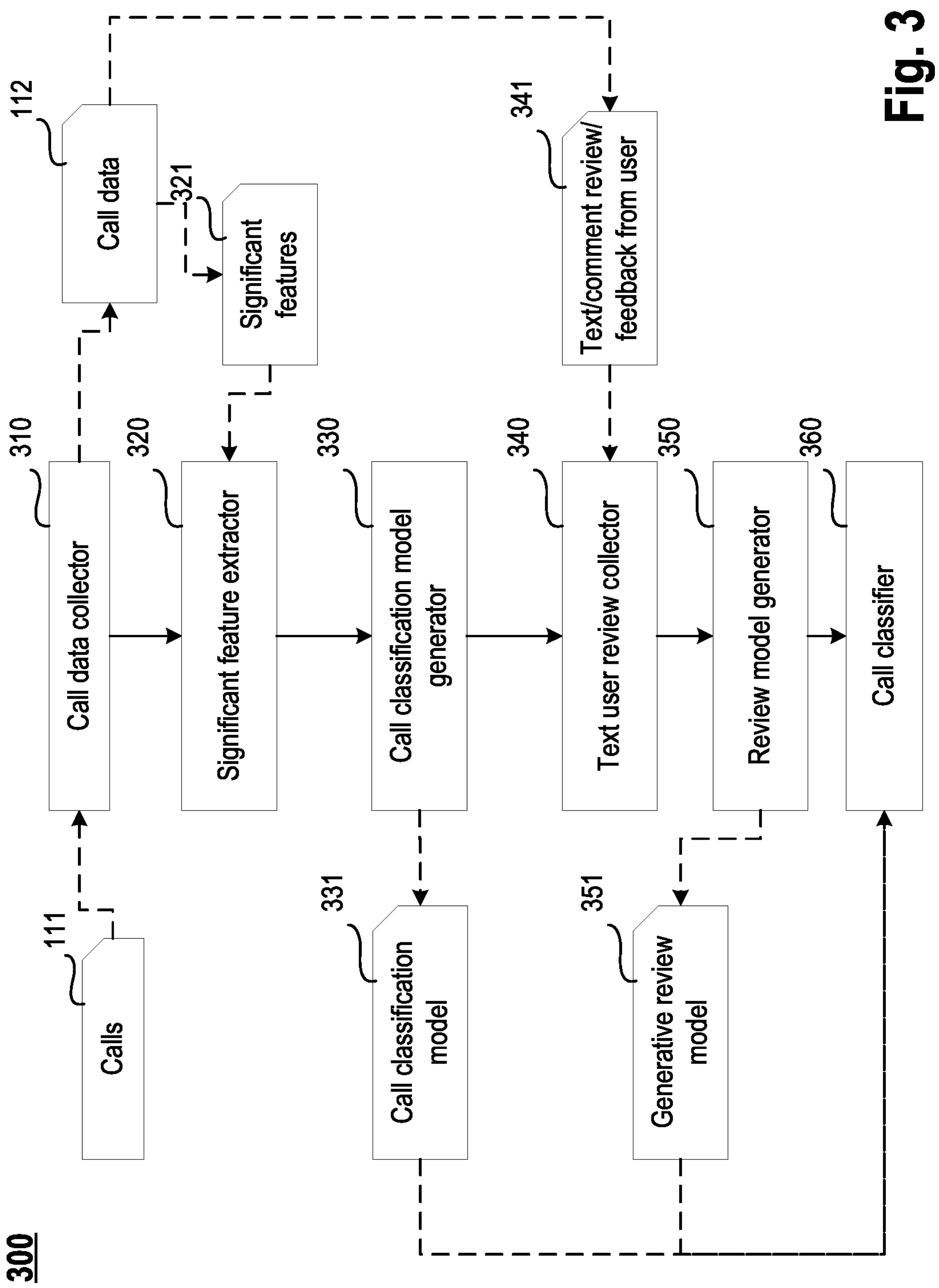
FIG. 3 illustrates an example of a system for call classification in accordance with aspects of the present disclosure.

FIG. 3 illustrates an example of a system 300 for call classification in accordance with aspects of the present disclosure.

The system 300 for call classification consists of a call data collector 310, a significant feature extractor 320, a call classification model generator 330, a text user review collector 340, a review generation model 350, and a call classifier 360. The components described below may be implemented as elements of a computer system or set of computer systems, described in more detail in FIG. 5.

The call data collector 310 is configured to collect call data 112 on calls 111, and the collected call data 112 is provided to the significant feature extractor 320 and the text user review collector 340, wherein each call 111 is associated with a specific call ID 121.

In one aspect, at least one of the following serves as a call identifier: a phone number; and/or a unique identifier of the caller, e.g., when using instant messaging and voice over IP services, the unique identifier may not be a phone number.

In one aspect, the call data 112 includes at least significant features 321 or text/comment review/feedback from users 341 (hereinafter "text review 341").

In another aspect, the significant features 321 comprise at least one of the following: a call ID, a call duration, a call time, which of the parties participating in the call 111 ended the call, and/or whether data was transferred between the receiving party and the calling party of the call 111.

In another aspect, a text review 341 from the user contains at least one of the following: information about classification of the call 111; and information about a classification error of an automated system.

In one aspect, the significant feature extractor 320 is configured to isolate the significant features 321 from the call data 112 received from the call data collector 310, and to transmit the significant features 321 to the call classification model generator 330.

In one aspect, the call classification model generator 330 is configured to generate a call classification model 331 based on the significant features 321 obtained from the significant feature extractor 320. The call classification model 331 comprises a set of rules based on which the call 111 is classified to a predefined call class.

In one aspect, the text user review collector 340 is configured to extract the text review 341 from reviews received from users. The text review 341 may be received as part of call data 112. That is, the call data collector 310 collects the call data 112 which may contain the significant features 321 as well as the text reviews 341. The selected (extracted) text reviews 341 is then transmitted to the review model generator 350.

The review model generator 350 is configured to generate generative review model 351 based on the text review 341 obtained from the text user review collector 340. In one example, the review model 351 is a generative model based on which the review of the user 341 is matched with a predetermined topic of a description of a call classification, i.e., a class for a call.

In one aspect, the generative review model 351 may be a Latent Dirichlet allocation (LDA) model.

In one aspect, the call classifier 360 is designed to classify the call 111 for which call data 112 was collected using the generated call classification model 331 and the generative review model 351.

In one aspect, the call 111 is classified by weighting relative contributions of each of the generated models 331 and 351.

In one aspect, when classifying a call 111 using a call classifier 360, additional data on previously classified calls is used, including at least one of the following:

- the ID of the call by which the classification was made;
- a dictionary with word form, the word forms belonging to call identifiers by which the classification was performed based on text review from users; and
- previously formed classifying heuristics.

In another aspect, the call identifier is recognized as undesirable and, accordingly, the call 111 itself is also recognized as undesirable if at least one of the following conditions is met: a condition for the call duration for the suspicious call ID being less than a predetermined threshold; and/or the party ending the call being the receiving party of the call 111.

Figure 4:
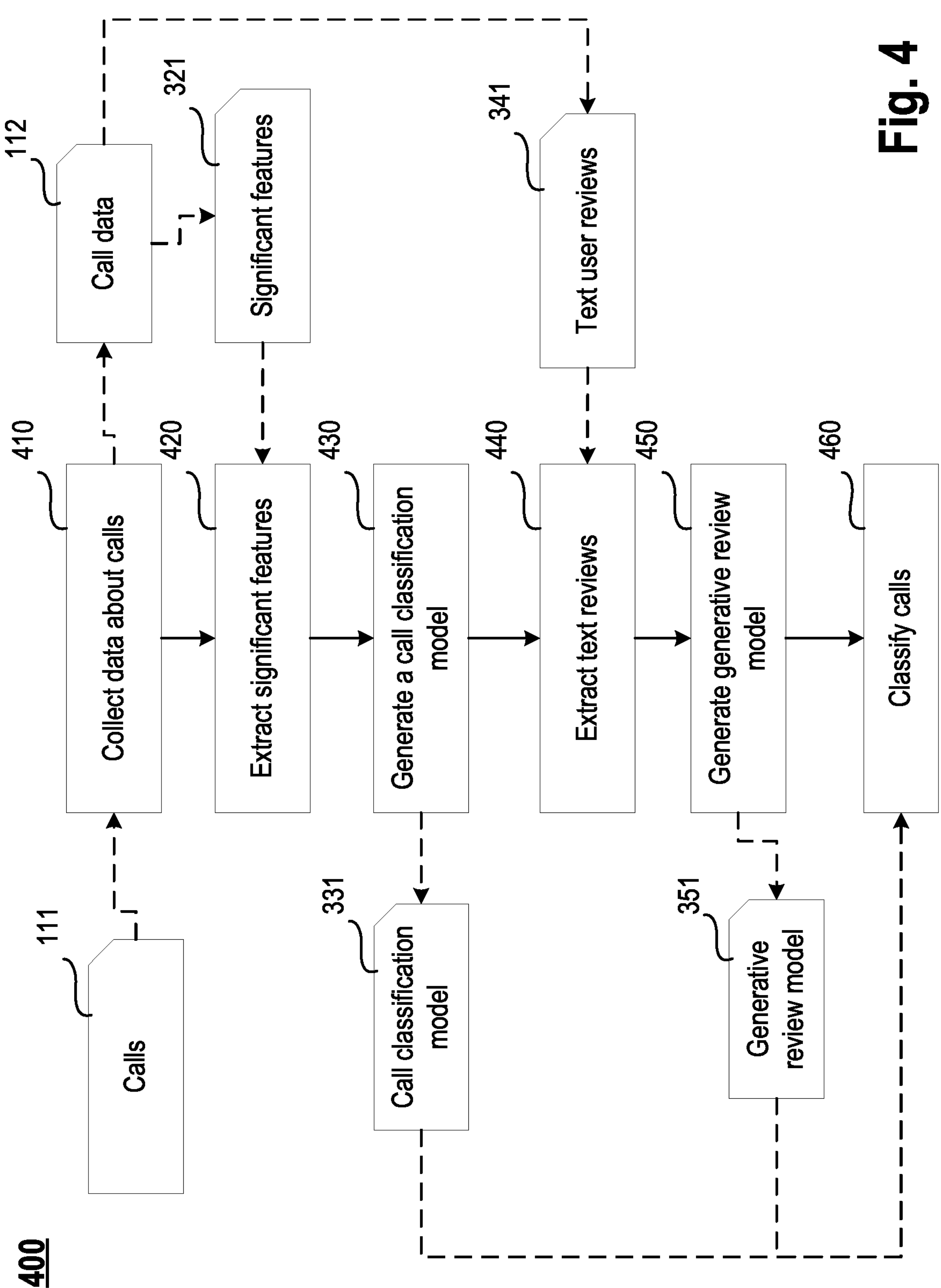
FIG. 4 illustrates an exemplary method for classifying a call in accordance with aspects of the present disclosure.

FIG. 4 illustrates an exemplary method 400 for classifying a call in accordance with aspects of the present disclosure.

The method 400 for classifying a call comprises a step 410 at which call data is collected, a step 420 at which significant features are identified, a step 430 at which a call classification model is formed, a step 440 at which text review from users is extracted, a step 450 at which a generative review model is generated, and a step 460 on which the calls are classified.

In one aspect, method 400 for call classification of calls may be performed using the means of the call classification system, which contains a processor and memory for this purpose and is described in more detail in FIG. 3.

In step 410, using call data collector 310, method 400, collects call data 112 for each call, wherein each call 111 is associated with a specific call ID 121.

In one aspect, at least one of the following serves as a call identifier: a phone number; and/or a unique identifier of a caller, e.g., when using instant messaging and voice over IP services.

In one aspect, the call data 112 includes at least significant features 321 and text reviews 341 received from users.

In one aspect, the significant features 321 include at least one of the following:

a call ID, a call duration, a call time, which of the parties participating in the call 111 ended the call, and whether data was transferred between the receiving party and the calling party of the call 111.

In one aspect, the text review 341 from the user contains at least one of the following:

information about the possible classification of the call; and information about the classification error of an automated system.

In step 420, by the significant feature extractor 320, method 400 extracts significant features 321 from the call data 112 collected.

In step 430, by a call classification model 330 generator, method 400 generates a call classification model 331 based on the significant features 321 identified in step 420, wherein the call classification model 331 comprises a set of rules based on which a predetermined call class is assigned to the call 111.

In step 440, by text review collector 340, method 400 extracts the text review 341 received from the users. The text review 341 is obtained from the call data 112 collected in step 410.

In step 450, using the review model generator 350, method 400 generates a generative review model 351 based on the text review 341 extracted in step 440.

In one aspect, the review model generator 350 is designed to generate a generative review model 351 based on the text review of users 341 obtained from the text user review collector 340, wherein the generative review model 351 is a generative model based on which the review of the user 341 is matched with a predetermined topic of a description of the call class.

In step 460, method 400, using the call classifier 360, classifies the call 111 for which the call data 112 was collected based on the call classification model 331 generated in step 430 and the generative review model 351 generated in steps 450.

In one aspect, the call 111 is classified by weighting relative contributions of each of the generated models 331 and 351.

In one aspect, in addition, when classifying a call 111, data on previously classified calls are used, including at least one of the following:

the ID of the call by which the classification was made;

a dictionary with word forms, the word forms belonging to the call identifiers by which the classification was performed based on text review from users; and previously formed classifying heuristics.

In one aspect, the call identifier is recognized as undesirable and, accordingly, the call 111 itself is also recognized as undesirable if at least one of the following conditions is met:

the call duration for the suspicious call ID is less than the threshold; and the party ending the call is the receiving party.

Figure 5:
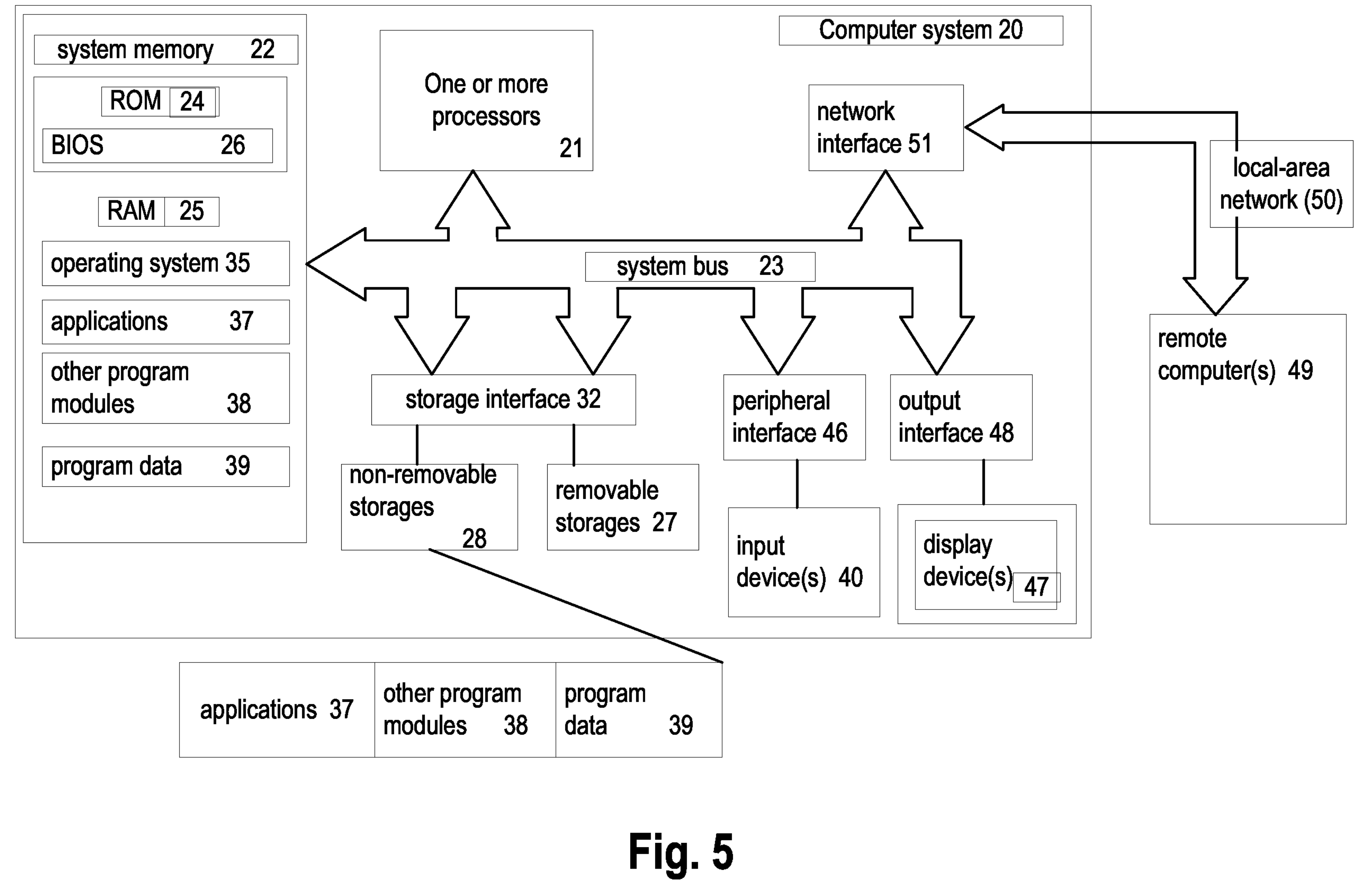
FIG. 5 presents an example of a general purpose computer system on which aspects of the present disclosure can be implemented.

FIG. 5 is a block diagram illustrating a computer system 20 on which aspects of systems and methods for classifying calls may be implemented in accordance with exemplary aspects. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for classifying calls, the method comprising:

collecting, by one or more hardware processors, call data for each call, wherein each call is associated with a unique call identifier;

extracting, by one or more hardware processors, significant features from the collected call data;

generating, by one or more hardware processors, a call classification model based on the extracted significant features, wherein the call classification model comprises a set of rules based on which a predetermined call class is assigned to the call;

extracting, by one or more hardware processors, a text review from the collected call data;

generating, by one or more hardware processors, a generative review model based on the extracted text review, the generative review model used for correlating text reviews with a call class; and classifying, by one or more hardware processors, the call for which the call data was collected by weighting relative contributions of each of the generated call classification model and generative review model.

2. The method of claim 1, wherein the unique call identifier comprises:

a phone number; or a unique identifier for the caller when using instant messaging and Voice over Internet Protocol (VOIP) services.

3. The method of claim 1, wherein the call data includes at least one of:

a significant feature that includes at least one of:

a call identifier;

a duration of the call;

a time of the call;

which participant of the call ended the call; and whether data was transferred between a calling party and a receiving party of the call; and a text review received from one or more users, the text review comprising at least one of:

a list of classifications of calls; and information about classification errors by an automated system.

4. The method of claim 1, wherein a Latent Dirichlet allocation (LDA) generative model is used as a generative review model.

5. The method of claim 1, wherein the classifying of the call is further based on data on previous classified calls including at least one of:

identification of the call by which the classification was made;

a dictionary with word forms, the word forms being based on text reviews from users, the text reviews being associated with call identifiers with which the classification was performed; and previously formed classifying heuristics.

6. The method of claim 1, wherein the unique call identifier is recognized as an undesirable when at least one of the following conditions is satisfied:

a call duration associated with a suspicious call identifier being less than a predetermined threshold; and a party ending the call being the receiving party of the call.

7. A system for classifying calls, comprising:

one or more hardware processors;

one or more memory media;

a combination of the one or more processors configured to:

collect call data for each call, wherein each call is associated with a unique call identifier;

extract significant features from the collected call data;

generate call classification model based on the extracted significant features, wherein the call classification model comprises a set of rules based on which a predetermined call class is assigned to the call;

extract a text review from the collected call data;

generate a generative review model based on the extracted text review, the generative review model used for correlating text reviews with a call class; and classify the call for which the call data was collected by weighting relative contributions of each of the generated call classification model and generative review model.

8. The system of claim 7, wherein the unique call identifier comprises:

a phone number; or a unique identifier for the caller when using instant messaging and Voice over Internet Protocol (VOIP) services.

9. The system of claim 7, wherein the call data includes at least one of:

a significant feature that includes at least one of:

a call identifier;

a duration of the call;

a time of the call;

which participant of the call ended the call; and whether data was transferred between a calling party and a receiving party of the call; and a text review received from one or more users, the text review comprising at least one of:

a list of classifications of calls; and information about classification errors by an automated system.

10. The system of claim 7, wherein a Latent Dirichlet allocation (LDA) generative model is used as a generative review model.

11. The system of claim 7, wherein the classifying of the call is further based on data on previous classified calls including at least one of:

identification of the call by which the classification was made;

a dictionary with word forms, the word forms being based on text reviews from users, the text reviews being associated with call identifiers with which the classification was performed; and previously formed classifying heuristics.

12. The system of claim 7, wherein the unique call identifier is recognized as an undesirable when at least one of the following conditions is satisfied:

a call duration associated with a suspicious call identifier being less than a predetermined threshold; and a party ending the call being the receiving party of the call.

13. A non-transitory computer readable medium storing thereon computer executable instructions for classifying calls, including instructions for:

collecting call data for each call, wherein each call is associated with a unique call identifier;

extracting significant features from the collected call data;

generating a call classification model based on the extracted significant features, wherein the call classification model comprises a set of rules based on which a predetermined call class is assigned to the call;

extracting a text review from the collected call data;

generating a generative review model based on the extracted text review, the generative review model used for correlating text reviews with a call class; and classifying the call for which the call data was collected by weighting relative contributions of each of the generated call classification model and generative review model.

14. The non-transitory computer readable medium of claim 13, wherein the unique call identifier comprises:

a phone number; or a unique identifier for the caller when using instant messaging and Voice over Internet Protocol (VOIP) services.

15. The non-transitory computer readable medium of claim 13, wherein the call data includes at least one of:

a significant feature that includes at least one of:

a call identifier;

a duration of the call;

a time of the call;

which participant of the call ended the call; and whether data was transferred between a calling party and a receiving party of the call; and a text review received from one or more users, the text review comprising at least one of:

a list of classifications of calls; and information about classification errors by an automated system.

16. The non-transitory computer readable medium of claim 13, wherein a Latent Dirichlet allocation (LDA) generative model is used as a generative review model.

17. The non-transitory computer readable medium of claim 13, wherein the classifying of the call is further based on data on previous classified calls including at least one of:

identification of the call by which the classification was made;

a dictionary with word forms, the word forms being based on text reviews from users, the text reviews being associated with call identifiers with which the classification was performed; and previously formed classifying heuristics.

18. The non-transitory computer readable medium of claim 13, wherein the unique call identifier is recognized as an undesirable when at least one of the following conditions is satisfied:

a call duration associated with a suspicious call identifier being less than a predetermined threshold; and a party ending the call being the receiving party of the call.

* * * * *